United States Patent
Kuroki et al.

(10) Patent No.: US 10,906,543 B2
(45) Date of Patent: Feb. 2, 2021

(54) VEHICLE CONTROL SYSTEM AND METHOD

(71) Applicant: DENSO CORPORATION, Kariya (JP)

(72) Inventors: Michihiro Kuroki, Kariya (JP); Takuma Sudo, Kariya (JP); Yohei Masui, Kariya (JP)

(73) Assignee: DENSO CORPORATION, Kariya (JP)

( * ) Notice: Subject to any disclaimer, the term of this patent is extended or adjusted under 35 U.S.C. 154(b) by 49 days.

(21) Appl. No.: 16/391,663

(22) Filed: Apr. 23, 2019

(65) Prior Publication Data
US 2019/0322277 A1    Oct. 24, 2019

(30) Foreign Application Priority Data

Apr. 23, 2018   (JP) .................................. 2018-082161

(51) Int. Cl.
*B60W 30/16*       (2020.01)
*B60W 30/12*       (2020.01)
*G01S 13/931*      (2020.01)
*B60W 50/00*       (2006.01)

(52) U.S. Cl.
CPC ............ *B60W 30/16* (2013.01); *B60W 30/12* (2013.01); *B60W 2050/0089* (2013.01); *B60W 2420/42* (2013.01); *B60W 2420/52* (2013.01); *B60W 2554/801* (2020.02); *G01S 2013/9325* (2013.01); *G01S 2013/93271* (2020.01)

(58) Field of Classification Search
CPC ..... B60W 2050/0089; B60W 2420/42; B60W 2420/52; B60W 2554/801; B60W 30/12; B60W 30/16; G01S 13/931; G01S 2013/9325; G01S 2013/93271
See application file for complete search history.

(56) References Cited

U.S. PATENT DOCUMENTS

| | | | |
|---|---|---|---|
| 5,805,103 A * | 9/1998 | Doi .................. | G01S 13/931 342/70 |
| 6,292,737 B1 * | 9/2001 | Higashimata ...... | B60K 31/0008 180/167 |
| 6,351,211 B1 * | 2/2002 | Bussard ............. | B60Q 1/302 340/438 |
| 6,373,400 B1 * | 4/2002 | Fujita ................ | B60K 35/00 340/901 |

(Continued)

FOREIGN PATENT DOCUMENTS

JP   2016-020118 A   2/2016

*Primary Examiner* — Babar Sarwar
(74) *Attorney, Agent, or Firm* — Maschoff Brennan

(57) ABSTRACT

A vehicle control system includes a preceding vehicle selector that selects a pair of preceding vehicles, a target pair recognizer that executes a pairing process of storing a distance between a first target and a second target belonging to the respective preceding vehicles as an offset, and an intervehicular distance setter that sets both of a distance between an own vehicle and a first target as an intervehicular distance when the first target and the second target are detected as a target pair, and a distance corrected based on the offset as an intervehicular distance when the first target out of the target pair is not detected. The target pair recognizer stores a history of determination parameters including at least one of changes in relative distance, relative speed, and lateral deviation amount between the first and second targets.

5 Claims, 13 Drawing Sheets

(56) References Cited

U.S. PATENT DOCUMENTS

| | | | | |
|---|---|---|---|---|
| 6,765,495 | B1* | 7/2004 | Dunning | G08G 1/161 |
| | | | | 340/435 |
| 9,260,114 | B2* | 2/2016 | Tokimasa | G01S 13/931 |
| 9,783,196 | B2* | 10/2017 | Tokimasa | B60W 10/18 |
| 9,868,441 | B2* | 1/2018 | Tokimasa | G01S 13/931 |
| 2001/0015698 | A1* | 8/2001 | Tokoro | G01S 13/42 |
| | | | | 342/70 |
| 2004/0167718 | A1* | 8/2004 | Hoenes | G01S 15/931 |
| | | | | 701/301 |
| 2005/0159875 | A1* | 7/2005 | Chia | G01S 13/931 |
| | | | | 701/93 |
| 2005/0216169 | A1* | 9/2005 | Arai | B60K 31/0008 |
| | | | | 701/96 |
| 2006/0265115 | A1* | 11/2006 | Etori | B60W 30/17 |
| | | | | 701/96 |
| 2007/0250241 | A1* | 10/2007 | Tanimichi | G08G 1/163 |
| | | | | 701/70 |
| 2010/0302371 | A1* | 12/2010 | Abrams | G08G 1/0175 |
| | | | | 348/149 |
| 2015/0175162 | A1* | 6/2015 | Nakadori | B60W 30/16 |
| | | | | 701/96 |
| 2016/0009280 | A1* | 1/2016 | Tokimasa | G01S 13/931 |
| | | | | 701/96 |
| 2016/0009282 | A1* | 1/2016 | Tokimasa | B60W 10/18 |
| | | | | 701/96 |
| 2016/0009283 | A1* | 1/2016 | Tokimasa | B60W 10/18 |
| | | | | 701/96 |
| 2016/0009284 | A1* | 1/2016 | Tokimasa | G01S 13/931 |
| | | | | 701/96 |
| 2019/0092329 | A1* | 3/2019 | Masui | G01S 13/72 |

* cited by examiner

VEHICLE CONTROL SYSTEM AND METHOD

CROSS-REFERENCE TO RELATED APPLICATION

This patent application is based on and claims priority to Japanese Patent Application No. 2018-082161, filed on Apr. 23, 2018 in the Japan Patent Office, the entire disclosure of which is hereby incorporated by reference herein.

BACKGROUND

Technical Field

Embodiments of the present disclosure relate to a vehicle control system and method that controls an intervehicular distance.

Related Art

A vehicle control system that controls an intervehicular distance is known as disclosed in Japanese Patent Application Publication No. 2016-020118 (JP-2016-020118-A), for example. In the vehicle control system of JP-2016-020118-A, when two targets detected by a sensor, such as vehicles, bicycles, walkers, etc., run in line in front of an own vehicle, a vehicle control system calculates and stores a distance between these two targets as an offset. When one target closer to the own vehicle out of these two targets is no longer detected, the offset is subtracted from a distance to the other one of the targets which is further from the own vehicle, so that intervehicular distance control is implemented based on the distance resulting from the subtraction.

In such a conventional technology, however, an inventor of this application has found that the intervehicular distance is corrected in unnecessary situations as described below. That is, two preceding vehicles (i.e., a first preceding vehicle and a second preceding vehicle) run at a similar speed for a certain period of time and collectively form a target pair in a first unnecessary situation. As a second unnecessary situation, a split occurs in a target belonging to the first preceding vehicle closer to the own vehicle out of two preceding vehicles when the first preceding vehicle changes a lane and such a split target and a target belonging to the second preceding vehicle collectively form a target pair.

In particular, in the second situation, since the preceding vehicle closer to the own vehicle changes the lane and no preceding vehicle exists just in front thereof, erroneous correction occurs with a great impact.

SUMMARY

Accordingly, one aspect of the present disclosure provides a novel vehicle control system that controls an intervehicular distance between an own vehicle and the preceding vehicle based on a target belonging to the preceding vehicle detected by a reflection wave issued from a radar. Specifically, the vehicle control system may be composed of at least the below described four elements. First, a preceding vehicle selector is included to select a target belonging to a preceding vehicle as an objective of intervehicular distance control based on a detection result generated by a radar system. Secondly, a target pair recognizer is included to execute a pairing process by recognizing a first target and a second target further from the own vehicle than the first target as a target pair of preceding vehicles and storing a distance between the first target and the second target as an offset when the first and second targets collectively meet a prescribed pairing condition. Thirdly, an intervehicular distance setter is included to set a distance between the own vehicle and a first target as an intervehicular distance when the offset is stored and a target pair is being detected and to set a corrected distance obtained by subtracting the offset from the distance between the own vehicle and a second target when the offset is stored and the first target out of the target pair disappears from the radar system and is not detected by the radar system. Fourthly, an intervehicular distance control execution section is further included to execute intervehicular distance control based on an intervehicular distance set by the intervehicular distance setter.

Further, in the vehicle control system, the target pair recognizer stores a history including determination parameters composed of at least one of a change in relative distance, a relative speed, and a change in lateral deviation amount between the first and the second targets to show an indirect variable relation therebetween. However, the pairing process is not executed when the pairing condition is established by the first and the second targets but the history indicates that at least one of the determination parameters has exceeded a given threshold.

Furthermore, according to a vehicle control system of a first embodiment of the present disclosure, since neither of the two targets are recognized as a target pair nor an offset therebetween is stored when a history indicates that at least one determination parameter has exceeded a threshold even if a pairing condition is met by them, a likelihood that wrong targets are recognized as the target pair can be reduced, thereby allowing more accurate intervehicular distance control.

According to a second embodiment of the present disclosure, a target pair recognizer executes the pairing process only when it is recognized based on an image captured by a camera mounted on an own vehicle that the preceding vehicle pulls an object (e.g., a car) and the first and second targets meet the pairing condition.

Hence, according to the second embodiment of the present disclosure, because the vehicle control system performs the pairing process only when it is recognized based on the image captured by the camera that a preceding vehicle (for example, a truck for carrying a car or a trailer) pulls the object, a likelihood that the intervehicular distance is erroneously corrected can be reduced, thereby allowing more accurate intervehicular distance control when the first target is not the object pulled by the preceding vehicle.

According to a third embodiment of the present disclosure, when a target belonging to a preceding vehicle selected by a preceding vehicle selector changes from a first target to a second target, and it is recognized based on an image captured by a camera mounted on an own vehicle that the second target belongs to another preceding vehicle preceding the first target, an intervehicular distance setter does not correct the intervehicular distance by an offset and sets a distance between the own vehicle and the second target as an intervehicular distance even if the first target is not detected but the offset is stored.

Hence, according to the vehicle control system of the third embodiment of the present disclosure, since the vehicle control system does not correct the intervehicular distance based on the offset when the target belonging to the preceding vehicle selected by the preceding vehicle selector changes from the first target to the second target, and the second target is recognized as a target belonging to another preceding vehicle preceding the first target based on the image of the camera, a likelihood that the intervehicular distance is erroneously corrected can be reduced, thereby allowing more accurate intervehicular distance control when the first and second targets belong to different vehicles, respectively.

According to fourth embodiment of the present disclosure, when a first target splits into multiple pieces thereby causing a target split, and the first target and another target split from the first target are not selected by the preceding vehicle selector as targets belonging to the preceding vehicles, an intervehicular distance setter does not correct the intervehicular distance based on the offset but sets a distance between the own vehicle and the second target as the intervehicular distance, even if the offset is stored but the first target and the other target split from the first target are not detected.

Hence, according to the vehicle control system the fourth embodiment of the present disclosure, since the intervehicular distance is not corrected based on the offset when the first target is not selected as the target belonging to the preceding vehicle after the first target splits, a likelihood that the intervehicular distance is erroneously corrected can be reduced, thereby allowing more accurate intervehicular distance control when the first and second targets belong to different cars from the other, respectively.

According to yet another aspect of the present disclosure, a vehicle control method controls an intervehicular distance between the own vehicle and a preceding vehicle preceding the own vehicle based on a target belonging to the preceding vehicle detected by a reflection wave issued from a radar system. The method includes the steps of: selecting one or more targets belonging to one or more preceding vehicles to apply intervehicular distance control based a detection result generated by the radar system; performing a pairing process to recognize a first target and a second target located further from the own vehicle than the first target as a target pair of the preceding vehicles and store a distance between the first target and the second target as an offset when the first and the second targets meet a prescribed a pairing condition; and setting a distance between the own vehicle and the first target as an intervehicular distance when the offset is stored and the target pair is detected.

The method also includes the steps of setting a corrected distance calculated by subtracting the offset from a distance between the own vehicle and the second target as an intervehicular distance when the first target out of the target pair disappears from the radar system and is not detected by the radar system; executing intervehicular distance control based on the intervehicular distance set by the intervehicular distance setter; and storing a history of determination parameters including at least one of a change in relative distance, a relative speed, and a change in lateral deviation amount between the first and second targets. Further included in the method is the step of inhibiting the pairing process when the pairing condition is met by the first and the second targets and the history indicates that at least one of the determination parameters has either reached or exceeded a given threshold.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
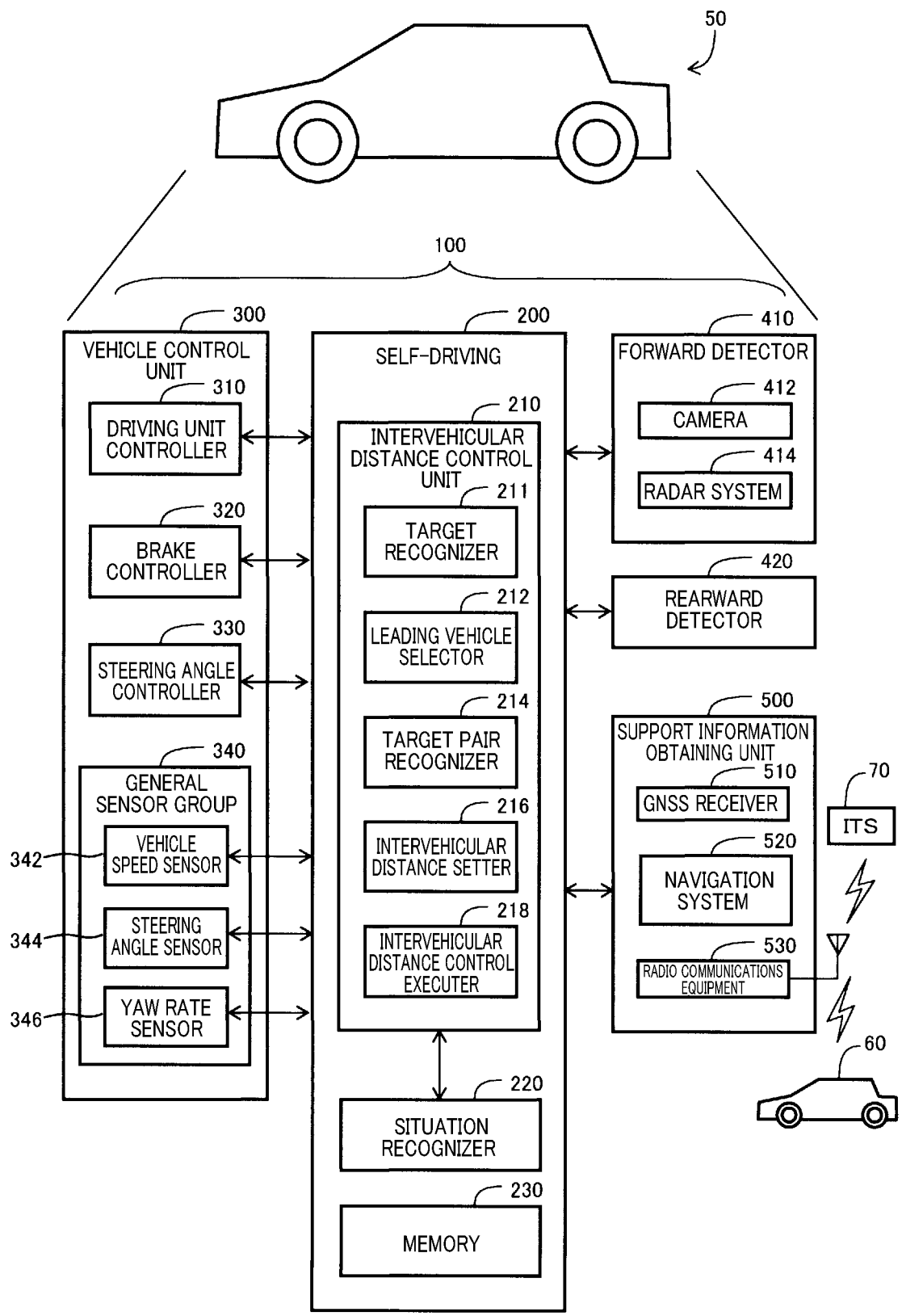
FIG. 1 is a block diagram illustrating a configuration of an exemplary self-driving control system according to a first embodiment of the present disclosure.

Referring now to the drawings, wherein like reference numerals designate identical or corresponding parts throughout the several views thereof, and in particular to FIG. 1, an exemplary configuration of a vehicle and a basic procedure of controlling an intervehicular distance are described herein below.

As shown in FIG. 1, a vehicle 50 of a first embodiment of the present disclosure includes an self-driving control system 100. The self-driving control system 100 includes a self-driving electronic control unit (ECU) 200, a vehicle control unit 300, and a forward detector 410. The self-driving control system 100 also includes a rearward detector 420 and a support information obtaining unit 500. These devices are connected to each other via an in-vehicle network such as a controller area network (CAN), etc. Herein below, the vehicle 50 is referred to as an own vehicle 50.

The self-driving ECU 200 initiates an intervehicular distance control unit 210 and a situation recognizer 220 to function by running computer program stored in a memory 230. However, a hardware circuit can realize some of the functions of the self-driving ECU 200.

The situation recognizer 220 recognizes driving situations of the own vehicle 50 and the other vehicle 60 and a surrounding environment as well based on various information pieces and detection values provided by a forward detector 410, a rearward detector 420, a support information obtaining unit 500, and a general sensor group 340.

The vehicle control unit 300 implements various controls to drive the vehicle 50, and is used in both of self-driving and manual driving systems. The vehicle control unit 300 includes a driving unit controller 310, a brake controller 320, a steering angle controller 330, and a general sensor group 340. The driving unit controller 310 functions to control a drive section (not shown) that drives wheels of the vehicle 50. As the drive section driving the wheels, at least one of an internal combustion engine and an electric motor can be used. The brake controller 320 controls application of a brake to the vehicle 50. For example, the brake controller 320 is constituted by an electronically controlled brake system (ECB). The steering angle controller 330 controls a steering angle of the wheel of the vehicle 50. The steering angle means an average steering angle of two front wheels of the vehicle 50. The steering angle controller 330 is constituted by an electric power steering system (EPS), for example. The general sensor group 340 is a common sensor group including a vehicle speed sensor 342, a steering angle sensor 344, and a yaw rate sensor 346 needed in driving the vehicle 50. The general sensor group 340 also includes a prescribed sensor used in both of a self-driving system and a manual driving system.

The forward detector 410 obtains various pieces of information related to objects, such as objects, road facilities (e.g., traffic lanes, intersections, traffic signals), etc., existing in front of the own vehicle 50 by using an on-vehicle sensor. In this embodiment of the present disclosure, the forward detector 410 includes a camera 412 and a radar system 414. As the camera 412, stereo and monocular cameras can be used. However, the camera 412 is preferably a color camera to distinguish colors of objects (for example, a white car lane dividing line and a yellow car lane dividing line). As the radar system 414, various radars that emit electromagnetic radiation can be used. For example, a LIDAR (Light Detection and Ranging) that emits light and a radar (e g a millimeter wave radar) that emits radio waves or the like are exemplified. The rearward detector 420 obtains various pieces of information related to objects, such as objects existing behind the own vehicle 50 and road facilities. The rearward detector 420 can also be configured by including the on-vehicle sensor similar to the forward detector 410.

The support information obtaining unit 500 obtains various pieces of support information used in self-driving. The support information obtaining unit 500 includes a GNSS (Global Navigation Satellite System) receiver 510, a navigation system 520 and a radio communications equipment 530. The GNSS receiver 510 positions a current position (e.g., a longitude, a latitude) of the own vehicle 50 based on navigational signals received from satellites that constitutes the GNSS. The navigation system 520 has an ability to determine a planned route in self-driving based on a destination and a location of the own vehicle detected by the GNSS receiver 510. Another sensor such as a gyro sensor, etc., may be used by the navigation system 520 to either determine or correct a scheduled route in addition to the GNSS receiver 510. The radio communications equipment 530 can exchange status information, such as conditions of the own vehicle 50, an ambient condition, etc., via radio communications with an advanced road traffic system 700 (e.g., an Intelligent Transport System). The radio communications equipment 530 can also exchange status information with other vehicles 60 and roadside radio equipment installed in road facilities by performing vehicle-vehicle communications and road-vehicle communications, respectively. The support information obtaining unit 500 may obtain some information related to a driving status of the own vehicle based on the status information obtained through such radio communications as well. The support information obtained by the support information obtaining unit 500 is transmitted to the self-driving ECU 200.

The self-driving ECU 200 executes self-driving of the own vehicle 50 based on various statuses recognized by the status recognizing section 220. Specifically, the intervehicular distance control unit 210 transmits a driving force instruction value that indicates an amount of driving force to the driving unit controller 310 that drives a drive unit (e.g., an engine or a motor). The intervehicular distance control unit 210 also transmits a brake instruction value that indicates an operating status of a brake mechanism to the brake controller 320. The intervehicular distance control unit 210 further transmits a steering angle instruction value that indicates steering angles of wheels to the steering angle controller 330 as well. Multiple controllers 310, 320 and 330 control respective mechanisms of control objectives in accordance with instruction values given to these controllers 310, 320 and 330.

Here, throughout description of the present disclosure, a term of automatic driving means an operation method, in which all of drive control, brake control and steering angle control are performed by self-driving without operation of a driver. Thus, in the self-driving, operating statuses of the drive unit and the brake system and steering angles of wheels are determined automatically. Further, a term of manual driving means a driving method, in which drive unit control operation (e.g., stepping on an acceleration pedal), brake control operation (e.g., stepping on a brake pedal), and steering angle control operation (e.g., rotation of steering wheels) are executed by a driver.

The intervehicular distance control unit 210 includes a target recognizer 211, a preceding vehicle selector 212, and a target pair recognizer 214. The intervehicular distance control unit 210 also includes an intervehicular distance setter 216, and an intervehicular distance control executer 218. Each of these devices is described herein below in detail. The intervehicular distance control unit 210 is equivalent to the vehicle control system and functions to provide full range speed adaptive cruise control (ACC). The full range speed is equivalent to a speed ranging from either zero or a very low speed to a prescribed high speed (e.g., a legal speed or a maximum speed set by a driver). By enabling intervehicular distance control based on the full range speed (especially, in a low-speed region), a driving load caused by frequent start and stop in congestion can be reduced. Here, control of the intervehicular distance is not equivalent to following travel but is used in the description of the present disclosure without making distinction therebetween. Further, intervehicular distance control by the intervehicular distance control unit 210 is executed not only during self-driving, but also during manual driving to assist a driver as a driving assistance. Especially, out of an advanced driving assistance that independently executes vehicle control in both longitudinal and lateral directions, the intervehicular distance control in the longitudinal direction can be performed.

Further, a target is detected by using a reflection wave emitted from a radar system 414. That is, the radar system 414 detects one or more peaks greater than a prescribed threshold in multiple signals included in the reflection wave, and recognizes the one or more peaks as one or more targets. The radar system 414 also detects target information of a distance, a relative velocity, and a lateral position per target, and provides the target information to the intervehicular distance control unit 210. Here, the lateral position of the target means a position on either the left side or the right side of a reference position of the own vehicle 50 (e.g. a widthwise center of a vehicle). The target recognizer 211 attaches a target ID to the target information and collectively stores these in the memory 230. When a recognized target is the same to a target previously recognized, the target recognizer 211 updates target information already stored in the memory 230. In various embodiments described herein below, a millimeter-wave radar that employs a high-frequency signal of a millimeter-wave band as transmission wave is used as the radar system 414. The radar system 414 updates the target information in a given cycle (e.g., one cycle/50 milli second). Hence, the target recognizer 211 correspondingly recognizes and updates the target also in this update cycle. As the memory 230, various devices, such as a ROM (Read Only Memory), a RAM (Random Access Memory), a hard disk drive system, a SSD (Solid State Drive), etc., can be used. The target information and the offset are stored in a prescribed memory area of the memory 230 together with other operation information.

Figure 2:
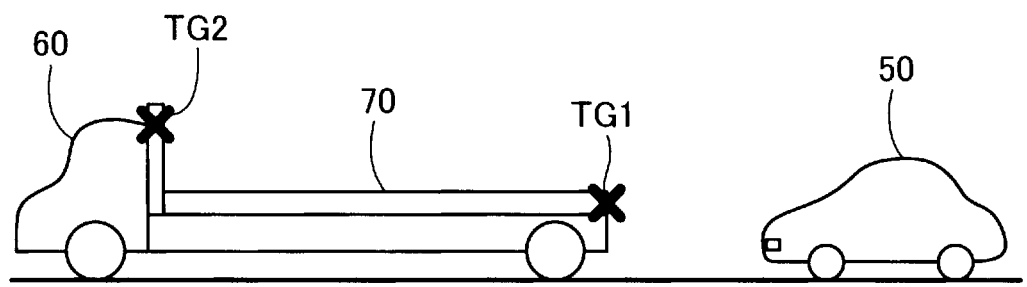
FIG. 2 is a diagram illustrating an exemplary system in which two targets included in a preceding vehicle are detected according to one embodiment of the present disclosure.

As shown in FIG. 2, when a preceding vehicle 60 preceding the own vehicle 50 pulls a vehicle cargo bed 70, a trailing end of the vehicle cargo bed 70 may be recognized as a first target TG1. At the same time, a trailing end of the preceding vehicle 60 may be recognized as a second target TG2 sometimes. The first target TG1 is closer to the own vehicle 50, and the second target TG2 is further from the own vehicle 50 than the first target TG1. Since an area of the trailing end of the vehicle cargo bed 70 is relatively small, reflection of the microwave or the like from the trailing end of the vehicle cargo bed 70, and accordingly generation of electric power based on the reflection of the microwave or the like become unstable. As a result, recognition of the first target TG1 also becomes unstable, thereby being neglected frequently. Especially, when the own vehicle 50 approaches the vehicle cargo bed 70 and the first target TG1 comes near a perimeter of a transmission angle of the transmission wave, accordingly, the target TG1 is sometimes neglected. Hence, traditionally, a technology has been proposed as a countermeasure in that a distance between two targets TG1 and TG2 is stored as an offset and an intervehicular distance is corrected based on the offset when the first target TG1 is no longer recognized.

Figure 3:
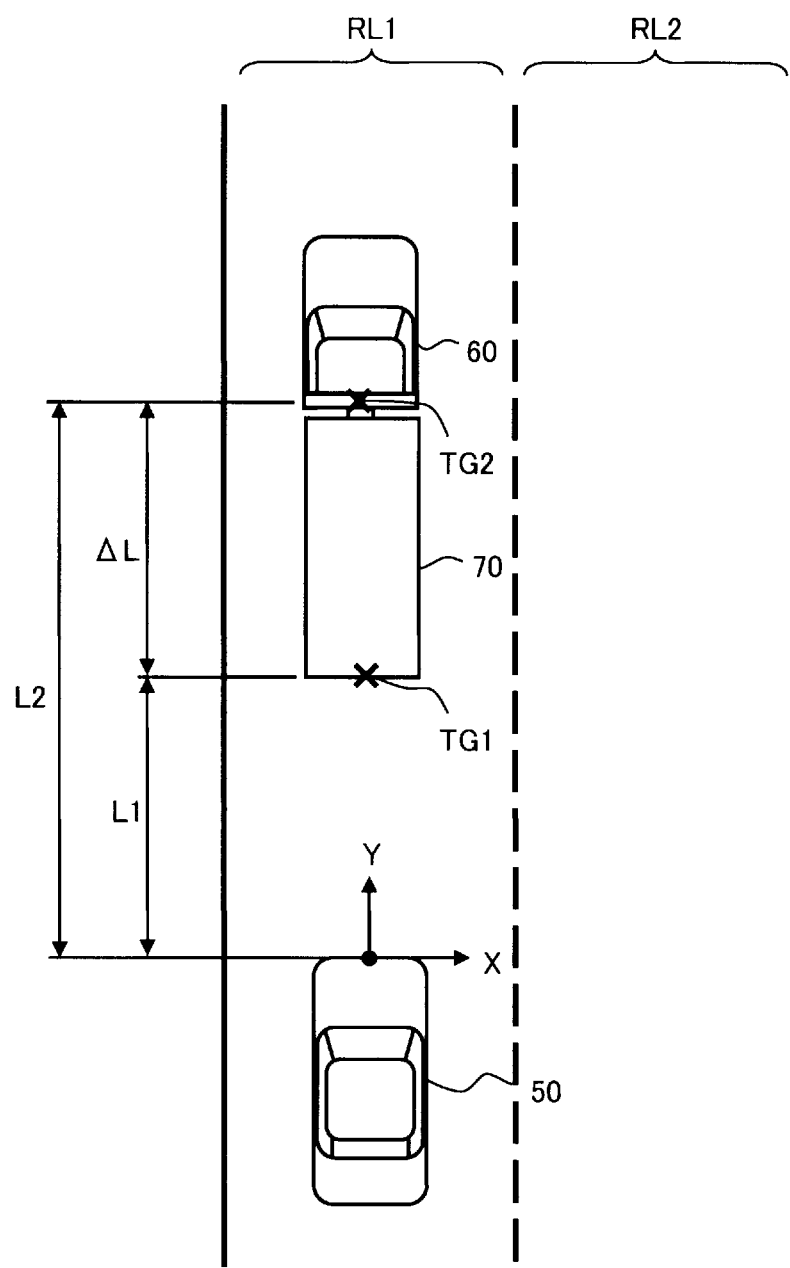
FIG. 3 is a diagram illustrating the two targets of the preceding vehicle and an offset existing therebetween according to one embodiment of the present disclosure.

Specifically, as shown in FIG. 3, two targets TG1 and TG2 are recognized. When these targets TG1 and TG2 meet a prescribed target pairing condition (described later in detail), a distance ΔL between these two targets TG1 and TG2 is stored as an offset. The offset ΔL is a value obtained by subtracting a distance L1 extending from the own vehicle 50 to the first target TG1 from a distances L2 extending from the own vehicle 50 to the second target TG2.

A basic process of storing the offset is described herein below with reference to FIG. 4. The basic process thereof is repeated by the target pair recognizer 214 in a given cycle. This cycle is favorably the same to a cycle in which the radar system 414 updates target information. Specifically, in step S10, the target pair recognizer 214 determines if two targets TG1 and TG2 recognized by the target recognizer 211 satisfy a prescribed pairing condition. As the pairing condition, for example, the below described condition can be exemplified. Two targets TG1 and TG2 belong to the same preceding vehicle running on a same car lane as the own vehicle runs, and a change in distance between these two targets TG1 and TG2 is less than a prescribed value (for example, 50 cm). Here, the change in distance means a difference between values lastly and currently obtained by executing the process of FIG. 4.

Here, determination if the two targets TG1 and TG2 belong to the same preceding vehicle running on the same car lane as the own vehicle runs can be made based on one or more prescribed conditions at least including one of the below described first to third conditions, for example. First, a distance between two targets TG1 and TG2 is a prescribed value (e.g., 20 meter) or less. Secondly, a lateral position of each of the two targets TG1 and TG2 falls within a prescribed acceptable range. For example, the lateral position is within ±1.7 meter from the reference position of the own vehicle 50. Thirdly, a relative speed of one of two targets TG1 and TG2 to the other one of two targets TG1 and TG2 is a prescribed value (for example, 0.5 m/s) or less.

Further, as the pairing condition, various conditions other than the above-described conditions can be adopted. For example, conditions for offset registration performed in an offset update process shown in FIG. 5 of JP-2016-20118-A described as a traditional technology can be utilized as the pairing condition as well.

Figure 4:
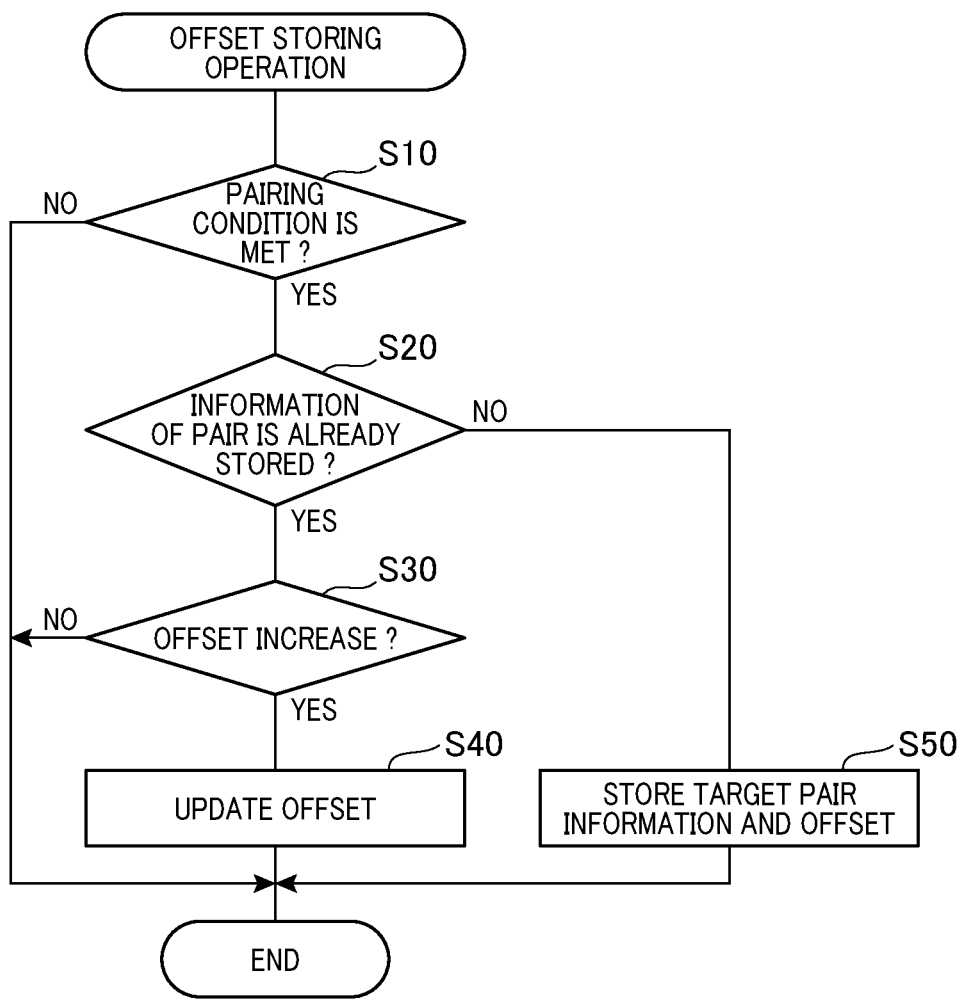
FIG. 4 is a flow chart illustrating an exemplary procedure of basic procedure of storing the offset in a memory according to one embodiment of the present disclosure.

If the two targets TG1 and TG2 do not satisfy the pairing condition, the process shown in FIG. 4 is terminated. By contrast, when the two targets TG1 and TG2 satisfy the pairing condition, the process goes to a step S20, and the target pair recognizer 214 determines if the two targets TG1 and TG2 have already been stored in the step. The target pair recognizer 214 stores a target ID, target information, such as a distance from the own vehicle, a relative velocity, a lateral deviation amount, etc., and an offset ΔL of a target pair in the memory 230 when the target pair is determined as having been previously met the pairing condition. Accordingly, determination can be made by searching target pair information stored in the memory 230 in step S20.

When the target pair TG1 and TG2 has not been stored, the process goes to a step S50, and the target pair recognizer 214 stores a new target pair TG1 and TG2 and a distance therebetween as the offset ΔL in the memory 230. By contrast, when the target pair TG1 and TG2 has been stored, the process goes to a step S30, and it is determined if a current offset value increases from the offset value already stored. If the current offset value is increased, the increased offset value is stored to update the previous offset value as a new offset value of the target pair TG1 and TG2. By contrast, if the offset value has not increased, the process shown in FIG. 4 is terminated. In other words, if the offset value decreases, the process shown in FIG. 4 is terminated without updating the offset value. A reason for operating in this way is that a room of intervehicular distance control advantageously becomes greater when the vehicle cargo bed 70 shown in FIGS. 2 and 3 is pulled and the offset value is increased. By contrast, when the offset value has decreased, it is preferable to maintain the offset value intact in the memory, because the room of intervehicular distance control can be desirably maintained. However, the steps S30 and S40 are optional. Herein after, a procedure after the step S20 of the FIG. 4 is called a pairing process.

Figure 5:
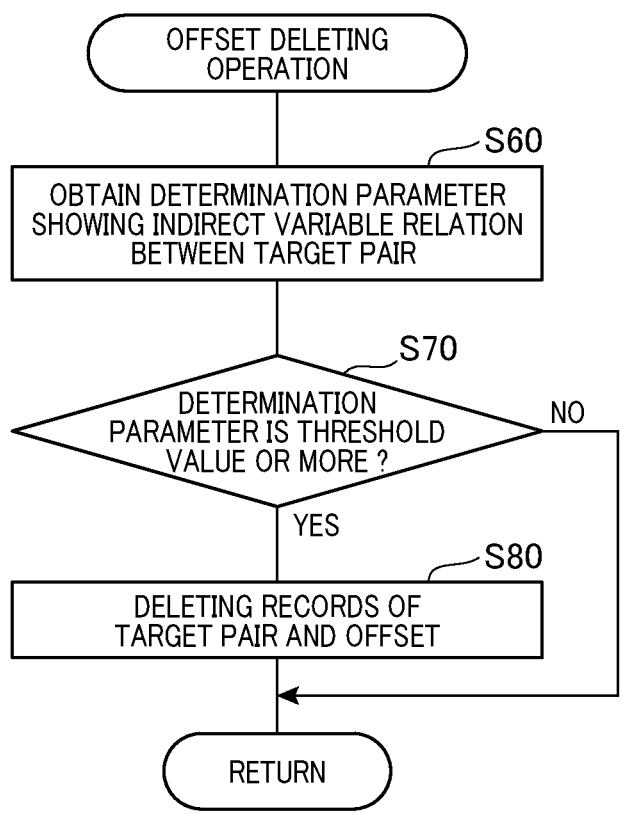
FIG. 5 is a flow chart illustrating an exemplary procedure of a basic procedure of resetting the offset according to one embodiment of the present disclosure.

Further, a basic process of deleting an offset (i.e., a so called offset clear) shown in FIG. 5 is also repeatedly executed in a given cycle by the target pair recognizer 214. This cycle can also be equalized to the update cycle in which the radar system 414 updates the target information as well. Specifically, in step S60, the target pair recognizer 214 obtains one or more determination parameters related to the two targets TG1 and TG2 among the below described three determination parameters recognized by the target recognizer 211. A first parameter is a change in relative distance between two targets TG1 and TG2. A second parameter is a relative velocity of one of two targets TG1 and TG2 to the other one of two targets TG1 and TG2. A third parameter is a change in lateral deviation amount (i.e., an amount of lateral deviation) of two targets TG1 and TG2. Here, each of the changes corresponds to a difference between values lastly and currently obtained by executing the process of FIG. 5.

In step S70, the target pair recognizer 214 determines if a determination parameter obtained is equivalent to a prescribed threshold or more. Herein below, the prescribed threshold is any one of an amount of change in distance between two targets TG1 and TG2 (for example, 50 cm), a relative speed of one of two targets TG1 and TG2 to the other one of two targets TG1 and TG2 (for example, 0.5 m/s), and an amount of lateral deviation between two targets TG1 and TG2 (for example, ±1.7 m).

In this embodiment of the present disclosure, when one or more determination parameters among the several determination parameters exceeds the threshold, the determination becomes positive in step S70. However, when two or more determination parameters of the above-described three determination parameters exceed the threshold, the determination in step S70 can be positive. With this, the determination in step S70 can be more reliable and preferable.

By contrast, if the determination parameter is less than the threshold, the process shown in FIG. 5 is terminated without deleting (i.e., clearing) the offset stored in the memory 230. By contrast, if the determining parameter is the threshold or more, the process goes to step S80, and a target pair and its offset stored in the memory 230 are deleted (i.e., cleared). The reason for control in this way is that when the determination parameter described above becomes the threshold or more, the two target TG1 and TG2 likely belong to different vehicles from the other.

Figure 6:
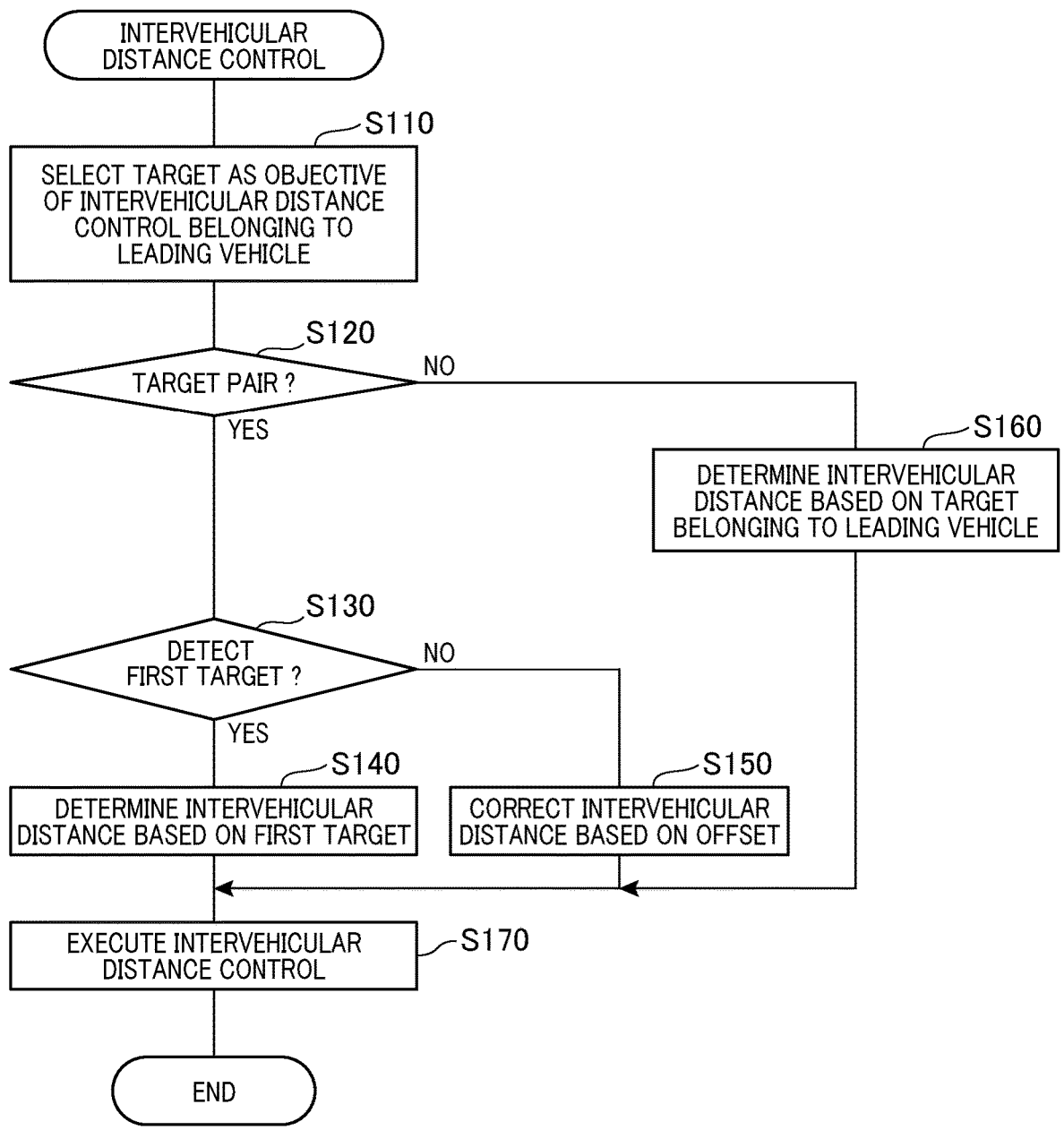
FIG. 6 is a flow chart illustrating an exemplary procedure of basic procedure of controlling an intervehicular distance according to one embodiment of the present disclosure.

Further, as shown in FIG. 6, the intervehicular distance control unit 210 performs intervehicular distance control based on a target pair and an offset ΔL therebetween stored in the memory 230 by executing the process shown in FIG. 4. Specifically, first, in step S110, the preceding vehicle selector 212 selects a target belonging to a preceding vehicle as an objective of intervehicular distance control from targets recognized by the target recognizer 211. In general, the objective of intervehicular distance control is a target closest to the own vehicle 50 out of preceding vehicles running on the same lane. It is estimated based on a lateral position of the target belonging to the preceding vehicle 50 if the target is running on the same lane.

In step S120, the target recognizer 211 determines if the target belonging to the preceding vehicle and selected in step S110 is included in the target pair stored in the memory 230. Such determination can be performed by comparing target information related to the target pair already stored with information of the target belonging to the preceding vehicle and selected in step S110. If the target belonging to the preceding vehicle is not a target included in the target pair already stored, an intervehicular distance is determined based on the target belonging to the preceding vehicle selected in step S110. Specifically, a distance from the own vehicle 50 to the target belonging to the preceding vehicle is used as the intervehicular distance as is. By contrast, if the target belonging to the preceding vehicle is the target included in the target pair already stored, the process goes to a step S130.

Specifically, in step S130, the target recognizer 211 determines if a first target TG1 included in a target pair already stored is detected. Here, as described with reference to FIG. 3, in the target pair of the first and second targets TG1 and TG2, the first target TG1 is closer to the own vehicle 50. If the first target TG1 is detected, the process goes to a step S140. Then, the intervehicular distance setter 216 determines a distance L1 (see FIG. 3) between the first target TG1 and the own vehicle 50 as an intervehicular distance. By contrast, if the first target TG1 is not detected, the process goes to a step S150. Then, the distance setter 216 calculates a corrected distance by subtracting the offset ΔL already stored in the memory unit from the distance L2 between the second target TG2 and the own vehicle 50, thereby determining the corrected distance as an intervehicular distance.

Subsequently, in step S170, the intervehicular distance control executer 218 executes intervehicular distance control based on the intervehicular distance determined and set in any one of steps S140, S150 and S160. That is, the intervehicular distance control executer 218 issues an instruction value to the vehicle control unit 300 to control the own vehicle 50 to either accelerate or decelerate so as to produce an intervehicular distance approximating a target value.

As described heretofore, in the basic process of the intervehicular distance control, the target pair and the offset therebetween are stored, updated and deleted (cleared) in accordance with the procedures shown in FIG. 4 and FIG. 5, and the intervehicular distance is controlled based on the offset stored in the memory 230 in accordance with the procedure shown in FIG. 6.

As described with reference to FIGS. 2 and 3 heretofore, two targets TG1 and TG2 preceding the own vehicle 50 are included in the same preceding vehicle. Specifically, the targets belong to the preceding vehicle 60 and the object (e.g., a vehicle cargo bed 70) pulled by the preceding vehicle 60. With this, even if the first target TG1 is no longer detected, the intervehicular distance control can be appropriately performed based on the offset ΔL. However, such two targets belonging to respective separate preceding vehicles can accidentally be recognized by the system as targets belonging to the same preceding vehicle.

Figure 7:
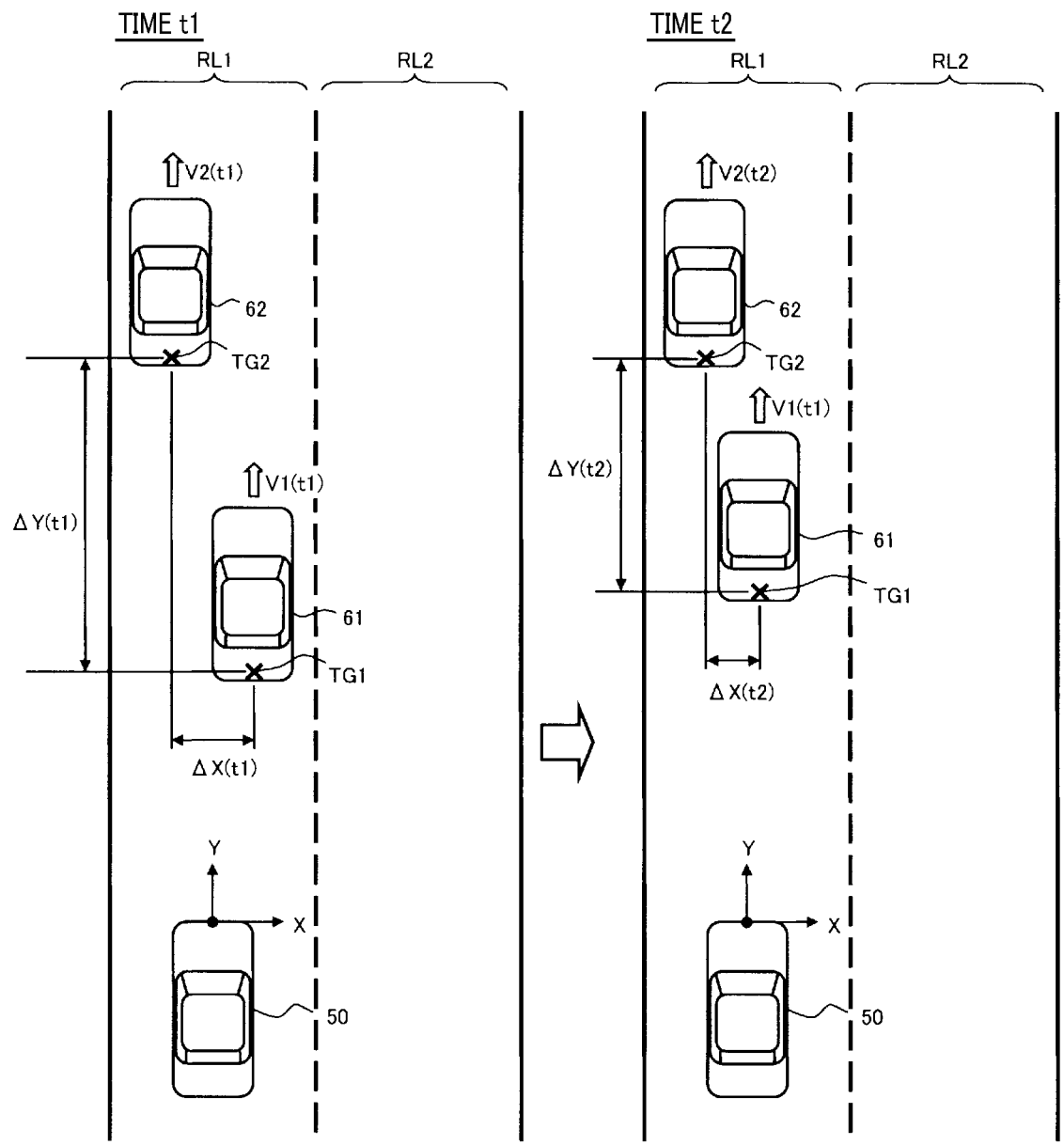
FIG. 7 is a diagram illustrating an exemplary relation between two targets belonging to two respective preceding vehicles according to one embodiment of the present disclosure.

Specifically, as shown in FIG. 7, two preceding vehicles 61 and 62 run the same driving lane RL1 as the own vehicle 50 runs out of two driving lanes RL1 and RL2, and these targets TG1 and TG2 of respective preceding vehicles 61 and 62 are being recognized by the target recognizer 211. As understood from FIG. 7 when comparing statuses of vehicles at respective times t1 and t2 with each other, either when a change in one of distance ΔY and lateral deviation amount ΔX between the two targets TG1 and TG2 is great, or when a relative velocity (i.e., V2−V1) is apparently different from the other, it can be recognized that these two targets TG1 and TG2 belong to the different vehicles, respectively. However, when two preceding vehicles 61 and 62 run at a low speed almost constantly keeping a short intervehicular distance due to traffic congestion, these two targets TG1 and TG2 of respective preceding vehicles 61 and 62 can erroneously be recognized as targets belonging to the same preceding vehicle, for example. In view of this, according to below described embodiments of the present disclosure, various intervehicular distance control systems can adequately conduct intervehicular distance control even in the above-described situation.

Figure 8:
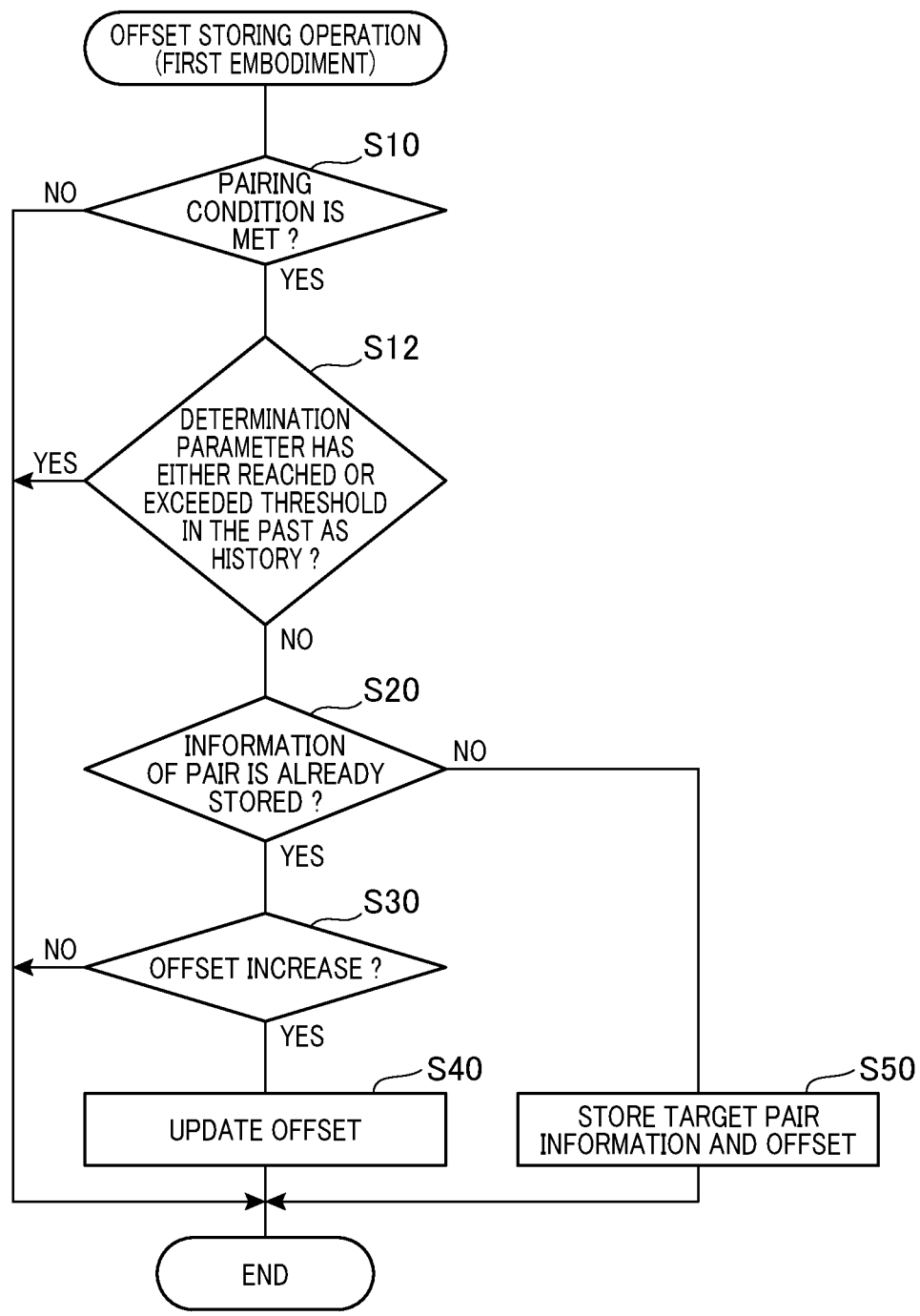
FIG. 8 is a flow chart illustrating an exemplary procedure of basic procedure of storing an offset in a memory according to a first embodiment of the present disclosure.

Now, a first embodiment of the present disclosure is described with reference to FIG. 8 and applicable drawings. As shown in FIG. 8, instead of the basic procedure of storing the offset illustrated in FIG. 4, a new procedure is employed in this embodiment of the present disclosure. FIG. 8 illustrates a similar procedure to that of FIG. 4, and is particularly constituted by additionally inserting a step S12 between steps S10 and S20 of FIG. 4. The procedure other than the step S12 is substantially the same as that of FIG. 4. However, since the configuration and the procedure shown in FIGS. 5 and 6 are employed in the first embodiment of the present disclosure as are, these explanations are not repeated.

Specifically, when a target pair TG1 and TG2 meets a pairing condition (Yes, in step S10), the process goes to a step S12. In step S12, the target pair recognizer 214 examines a history of at least one determination parameter (i.e., one or more changes in relative distance, relative speed, and lateral deviation amount) of the target pair TG1 and TG2 stored in the memory 230, and determines if the history shows that at least one determination parameter of the target pair TG1 and TG2 has reached or exceeded a threshold.

FIG. 7 demonstrates an exemplary situation when each of the below described determination parameters has reached or exceeded the threshold. A first determination parameter is a change in relative distance $\Delta Y$ between two targets TG1 and TG2. A second determination parameter is a relative velocity $\Delta V$ between the two targets TG1 and TG2. A third determination parameter is a change in lateral deviation amount $\Delta X$ between the targets TG1 and TG2.

That is because, as shown there, since the two targets TG1 and TG2 belong to the respective two preceding vehicles 61 and 62 running independently, the above-described three determination parameters exceed the threshold. However, these three determination parameters are not necessarily used, and only one or two determination parameters can be enough.

Further, regardless of if the pairing condition is met, the target pair recognizer 214 stores determination parameters of the two targets acting as determination objectives in step S10 in the memory 230 to generate a history.

In step S12 of FIG. 8, if it is determined that there is a history of a determination parameter that has reached or exceeded the prescribed threshold, the process is terminated without following steps subsequent to the step S20, even if the two targets TG1 and TG2 meet the pairing conditions. By contrast, such a history does not exist, the pairing process is performed in applicable steps subsequent to the step S20.

In this way, according to the first embodiment of the present disclosure, if a history of determination parameters regarding to two targets TG1 and TG2 includes a determination parameter that reaches or exceeds the threshold, the two targets are not recognized as the target pair, and an offset is not stored even if the pairing condition is met. Hence, a likelihood that wrong targets due to not belonging to the (same) preceding vehicle are erroneously recognized as a target pair can be reduced, thereby allowing more accurate intervehicular distance control.

Figure 9:
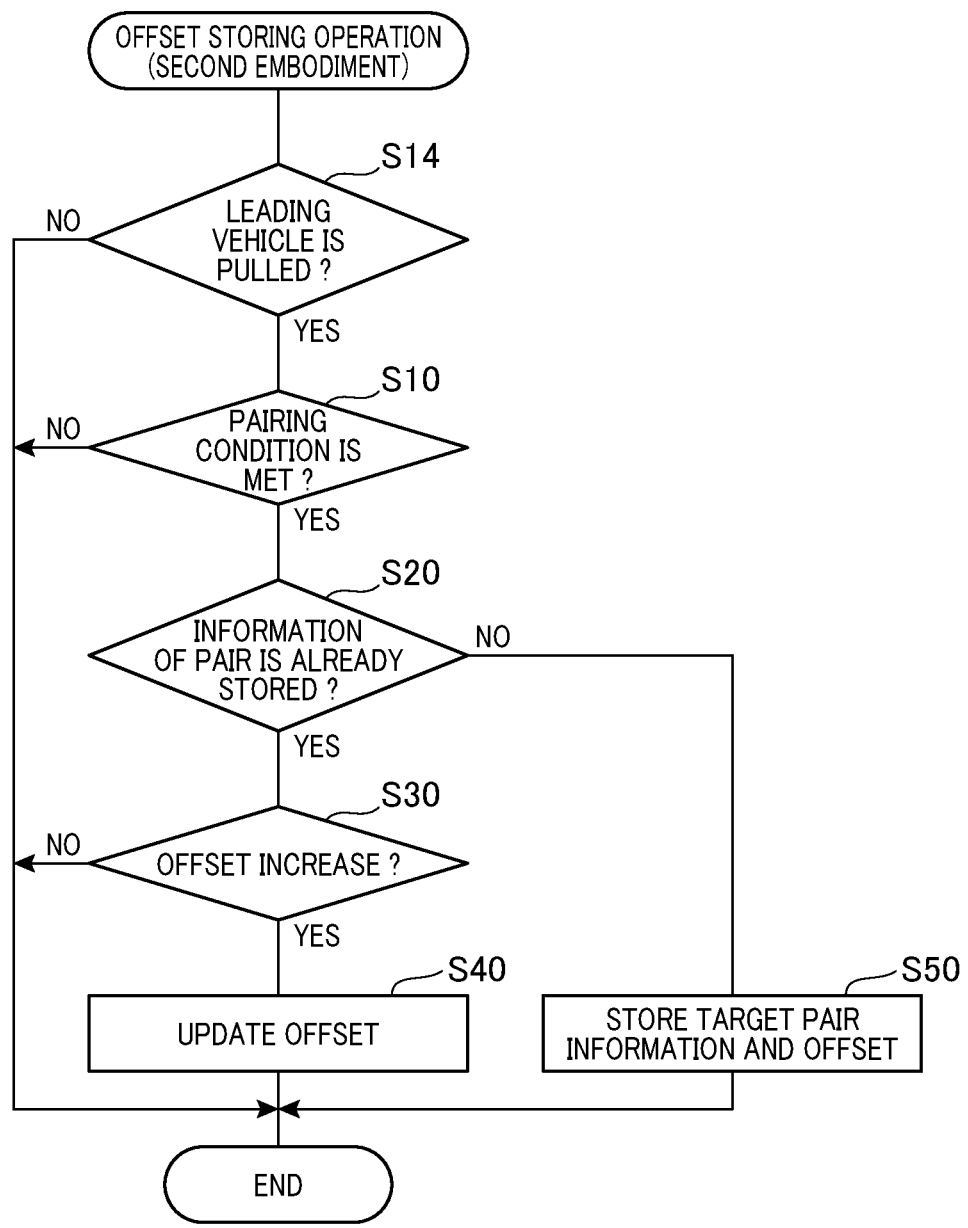
FIG. 9 is a flow chart illustrating an exemplary procedure of basic procedure of storing an offset in a memory according to second embodiment of the present disclosure.

Now, a second embodiment of the present disclosure is described in detail with reference to FIG. 9 and applicable drawings. As shown in FIG. 9, instead of the basic procedure of storing the offset shown in FIG. 4, a procedure shown in FIG. 9 is employed in this embodiment of the present disclosure. Specifically, the procedure of FIG. 9 is almost similar to that of FIG. 4, and is particularly constituted by additionally inserting a step S14 before the step S10 of FIG. 4. The procedure other than the step 14 is substantially the same as that of FIG. 4. Since the configuration and the procedures shown in FIGS. 5 and 6 can be similarly used in this embodiment of the present disclosure, these explanations are not repeated.

Specifically, in step S14, the target pair recognizer 214 determines if a preceding vehicle pulls an object (e.g., a cargo bed or a cargo box). Such determination is made based on an image captured by a camera 412 mounted on the own vehicle 50. As described earlier, the preceding vehicle (in step S14) means a vehicle closest to the own vehicle 50 out of preceding vehicles running ahead of the own vehicle 50 in the same lane. In step S14, if it is recognized that the preceding vehicle does not pull the object, the procedure of FIG. 9 is terminated without following applicable steps subsequent to the step S10. By contrast, if it is recognized that the preceding vehicle pulls the object, the step S10 and the applicable subsequent steps are followed. In other words, according to the second embodiment of the present disclosure, only if it is recognized that the preceding vehicle pulls the object and the two targets TG1 and TG2 meet the pairing condition, the pairing process is performed.

In this way, according to a second embodiment of the present disclosure, since the pairing process is performed only when it is recognized based on the image captured by the camera that the preceding vehicle pulls the object, for example, a vehicle cargo bed, and the pairing condition is met, a likelihood that the intervehicular distance is erroneously corrected can be reduced. In other words, since the pairing process is not performed when the first target TG1 is not the object pulled by the preceding vehicle, the likelihood can be reduced, thereby allowing more accurate intervehicular distance control.

Figure 10:
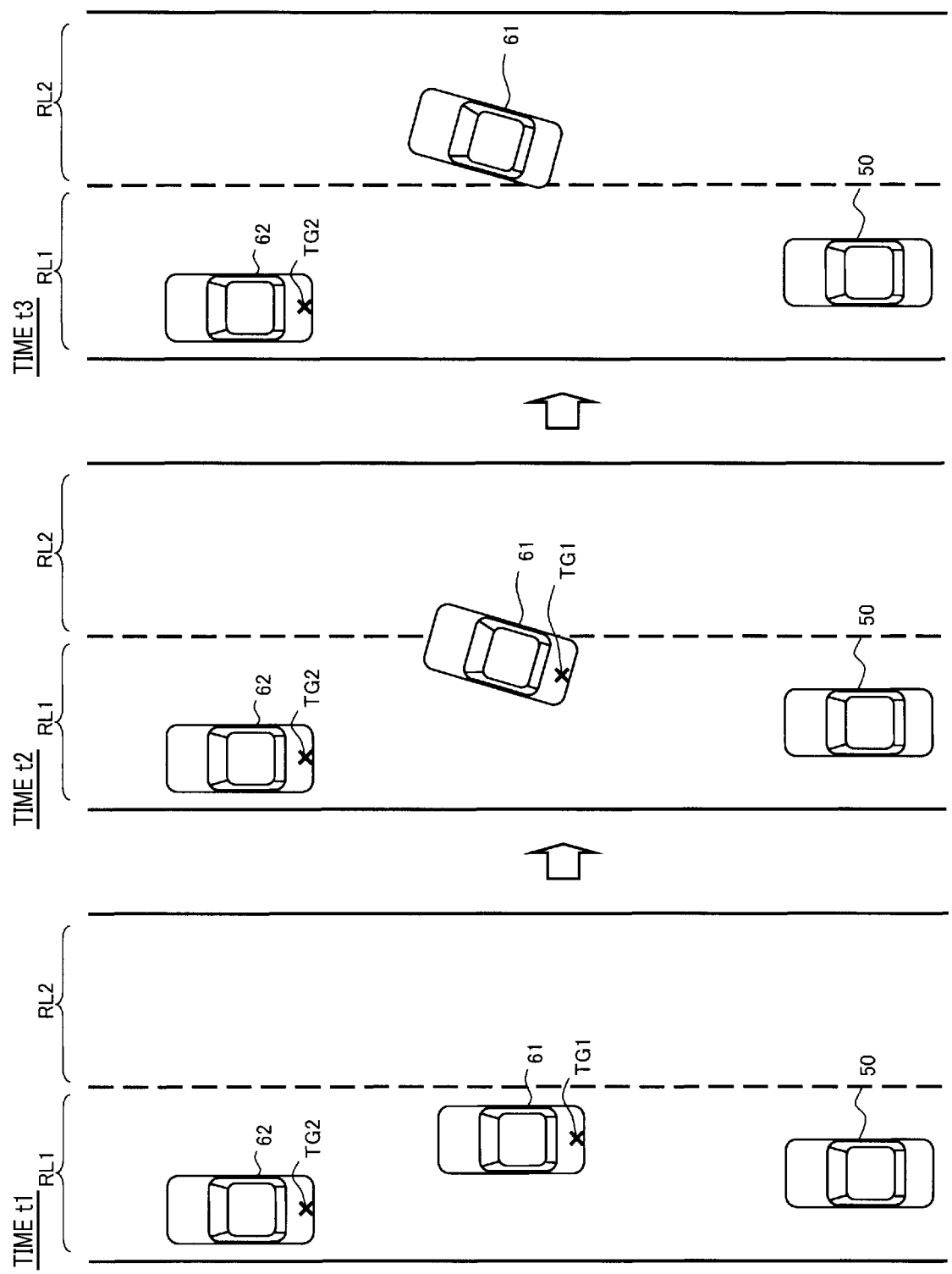
FIG. 10 is a diagram illustrating an exemplary aspect of a target belonging to a preceding vehicle when the target changes as time elapses according to a third embodiment of the present disclosure.

Now, a third embodiment of the present disclosure is described with reference to FIG. 10 and applicable drawings. In the third embodiment of the present disclosure, as shown in FIG. 10, it is assumed that two targets TG1 and TG2 belong to separate preceding vehicles 61 and 62, respectively. That is, at a time t1, two targets TG1 and TG2 are recognized, and the preceding vehicle selector 212 selects a first target TG1 closer to the own vehicle 50 as a target belonging to the preceding vehicle (i.e., a target determining an intervehicular distance). At times t2 and t3, the preceding vehicle 61 shifts from a current driving lane to the next driving lane RL2. At this moment, a target belonging to the preceding vehicle to be selected by the preceding vehicle selector 212 changes from the first target TG1 to the second target TG2 during the times t2 to t3, because, the first target TG1 deviates from the current driving lane RL1 in which the own vehicle 50 runs. Hence, the below described third embodiment of the present disclosure relates to intervehicular distance control executed in the above-described situation.

Figure 11:
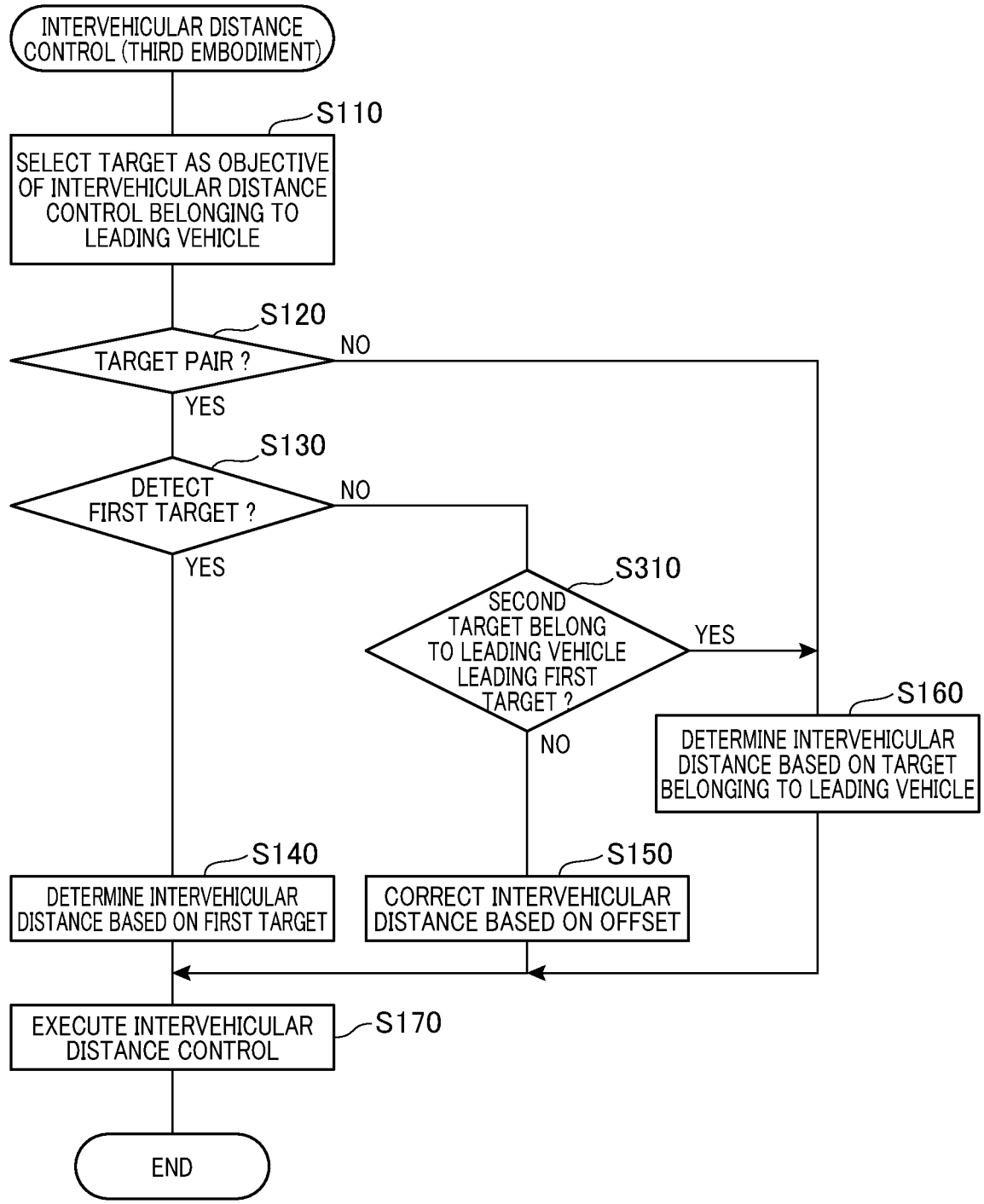
FIG. 11 is a flowchart illustrating an exemplary procedure of controlling an intervehicular distance according to a third embodiment of the present disclosure.

As shown in FIG. 11, the third embodiment of the present disclosure employs a new procedure instead of the basic procedure of the intervehicular distance control of FIG. 6. The procedure of FIG. 11 is almost similar to that of FIG. 6, and is particularly constituted by additionally inserting a step S310 between steps S130 and S150 of FIG. 6. The remaining procedure other than the step S310 is substantially the same as that of FIG. 6. Since the configuration and the procedures shown in FIGS. 4 and 5 can be used in this embodiment of the present disclosure, these explanations are not repeated.

As shown, a step S310 is executed when the first target TG1 is not detected and accordingly a second target TG2 is selected by the preceding vehicle selector 212 as a target belonging to a preceding vehicle at a time t3 shown in FIG. 10. Specifically, in step S310, the target recognizer 211 determines if the second target TG2 is a target belonging to another preceding vehicle 62 preceding the first target TG1. Such determination can be made by comparing an image captured by the camera 412 mounted on the own vehicle 50 with each of targets TG1 and TG2 detected by the radar system 414. When it is determined in step S310 that the second target TG2 is a target belonging to the other preceding vehicle 62 preceding the first target TG1 (i.e., the first target TG1 and the second target TG2 belong to different vehicles, respectively), the process goes to a step S160, and an intervehicular distance is determined based on the target TG2 of the other preceding vehicle 62. Specifically, even when the first target TG1 is not detected while an offset is stored, subtraction of the offset is not executed, but a distance between the own vehicle 50 and the second target TG2 is set as an intervehicular distance. By contrast, when it is determined in step S310, for example, based on a photograph captured by the camera, that the second target TG2 is not a target belonging to another preceding vehicle 62 preceding the first target TG1, the process goes to a step S150, and an intervehicular distance is corrected based on an offset stored in the memory 230.

In this way, according to the third embodiment of the present disclosure, since the intervehicular distance is not corrected based on the offset when the target belonging to the preceding vehicle selected by the preceding vehicle selector 212 changes from the first target TG1 to the second target TG2 and it is thereafter recognized based on the image captured by the camera 412 that the second target TG2 is the target belonging to the other preceding vehicle 62 preceding the first target TG1 (i.e., the first target TG1 and the second target TG2 belong to different vehicles, respectively), a likelihood that the intervehicular distance is erroneously corrected can be reduced, thereby allowing precisely control of the intervehicular distance.

Figure 12:
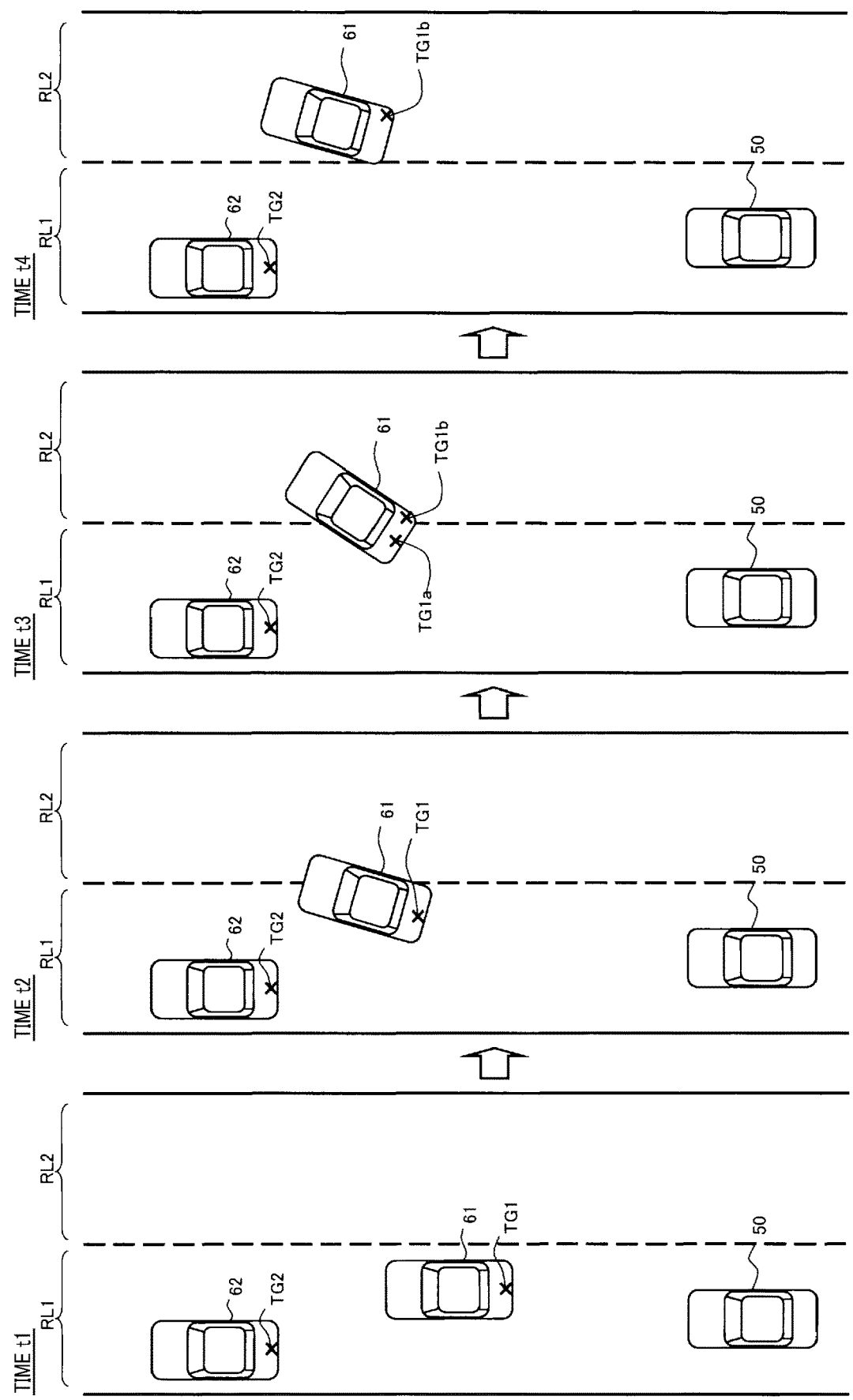
FIG. 12 is a diagram illustrating an aspect of a target when the target splits according to a fourth embodiment of the present disclosure.
Figure 14:
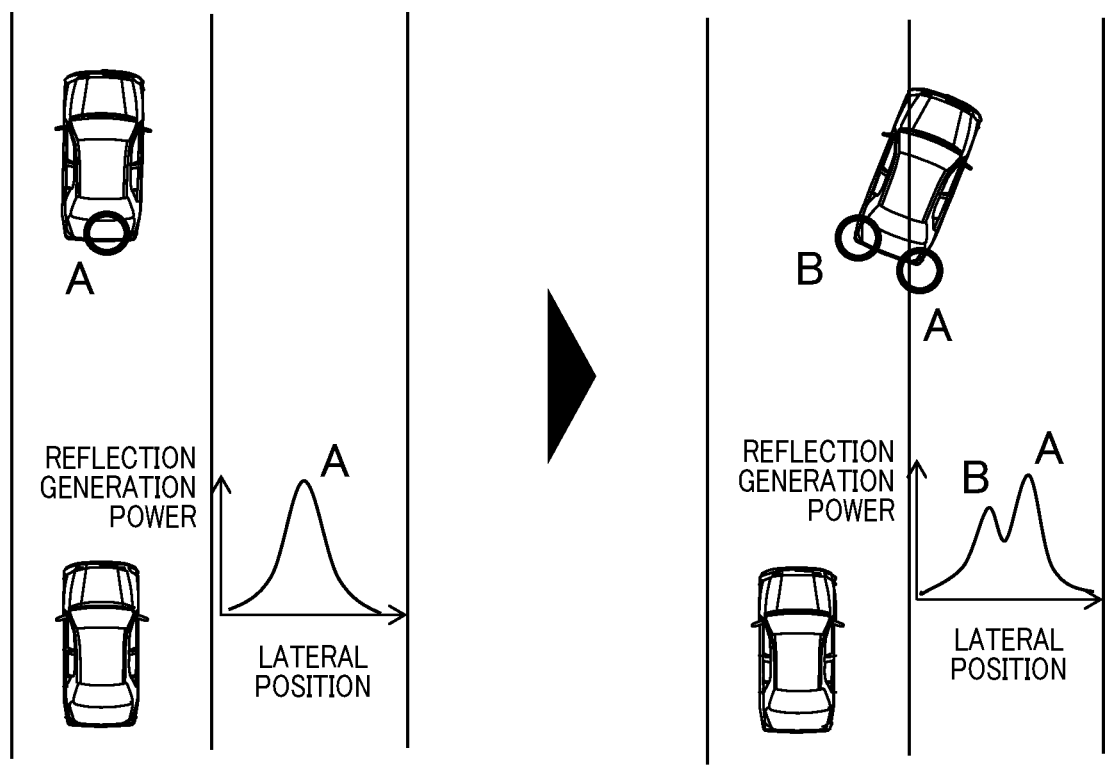
FIG. 14 is a diagram illustrating an exemplary power wave generated in a radar system when the target splits into two target pieces and the radar system receives reflection from these two target pieces in the fourth embodiment of the present disclosure.

Now a fourth embodiment is described in detail with reference to FIG. 12 and applicable drawings. As shown in FIG. 12, it is also assumed in the fourth embodiment of the present disclosure that two targets TG1 and TG2 belong to separate preceding vehicles 61 and 62, respectively. That is, at a time t1, two targets TG1 and TG2 are recognized, and the preceding vehicle selector 212 selects the first target TG1 closer to the own vehicle 50 as a target belonging to the preceding vehicle (i.e., an target determining an intervehicular distance). At times t2, t3 and t4, the preceding vehicles 61 as the first target TG1 shifts from a current driving lane RL1 to the next driving lane RL2. At the time t3, the first target TG1 splits into two targets TG1a, TG1b, thereby causing a so-called target split as illustrated in FIG. 14. That is, when a preceding vehicle (i.e., a target TG1) changes a lane thereby inclining thereto by a prescribed degree of angle, electric power generated by a microwave reflected from another portion of the preceding vehicle (TG1b) also increases and reaches another peak than a peak already caused by a microwave reflected from an original portion of the trailing end (TG1a). Specifically, as illustrated in FIG. 14, two peaks of the electric power (A and B) appear in such a situation thereby causing the so-called target split. Subsequently, the preceding vehicle selector 212 changes a target from the first target TG1 to the second target TG2 during times t3 and t4, because the first target TG1 deviates as a whole from the current driving lane RL1, in which the own vehicle 50 runs. Hence, correction by using the offset is not needed in this situation. The fourth embodiment of the present disclosure relates to intervehicular distance control executed in such a situation.

Figure 13:
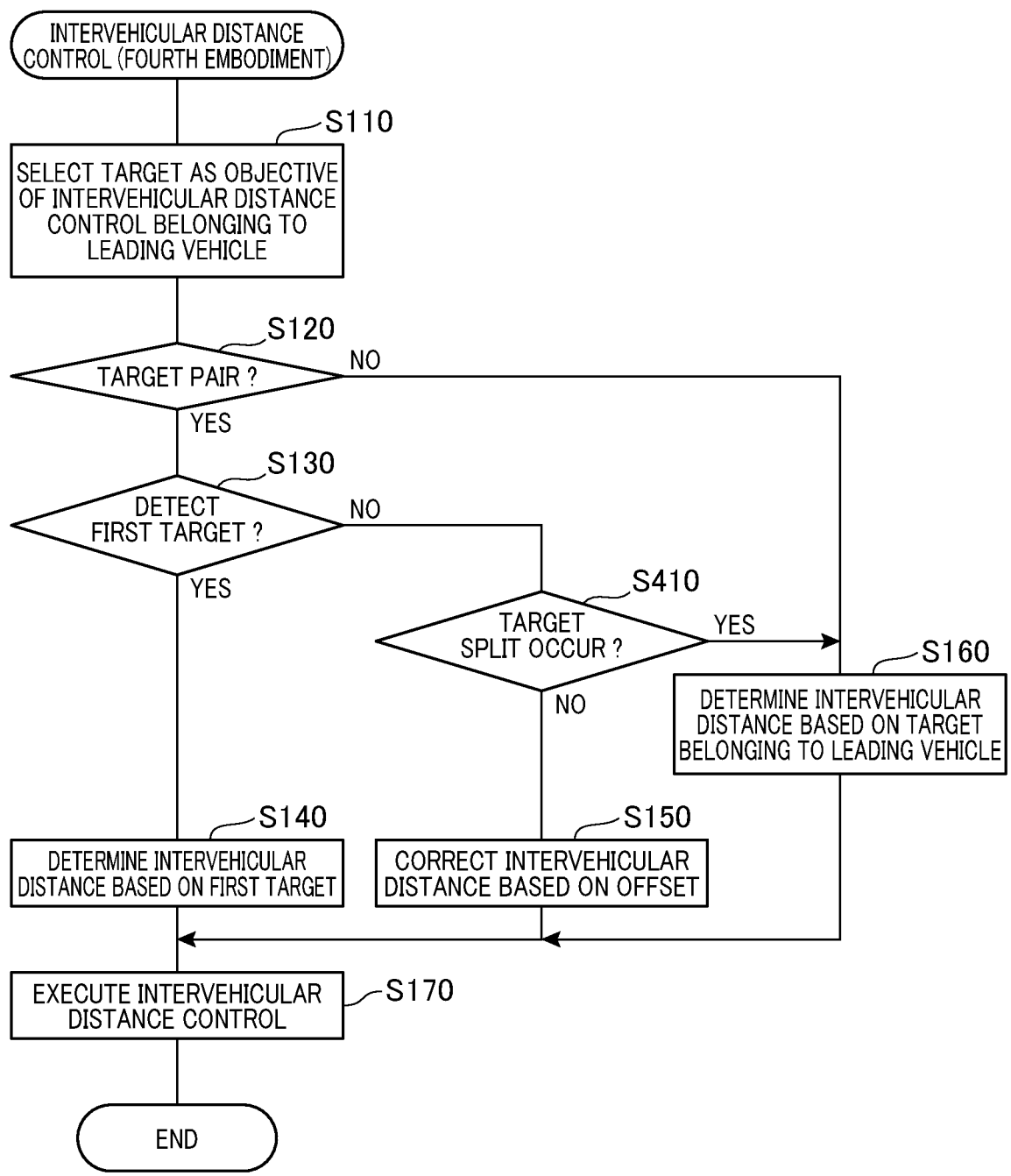
FIG. 13 is a flowchart illustrating an exemplary procedure of controlling an intervehicular distance according to a fourth embodiment of the present disclosure.

As shown in FIG. 13, the fourth embodiment of the present disclosure employs a new procedure instead of the basic procedure of the intervehicular distance control shown in FIG. 6. That is, a procedure of FIG. 13 is almost similar to that of FIG. 6 and is particularly constituted by additionally inserting steps S410 and S420 between steps S130 and S150 of FIG. 6. The remaining procedure other than these steps S410 and S420 is substantially the same as that of FIG. 6. Since the configuration and the procedures shown in FIGS. 4 and 5 can be used in this embodiment of the present disclosure as are, the same explanation is not repeated.

A step S410 is executed when neither a first target TG1a (equivalent to the target TG1) nor the other target TG1b split from the first target TG1a is selected by the preceding vehicle selector 212 and a second target TG2 is selected as a target belonging to a preceding vehicle. In step S410, the target recognizer 211 determines if a target split has occurred in the first target TG1. If it is recognized that the first target TG1 has caused the target split, the process goes to step S160 and an intervehicular distance is determined based on the target TG2 of the preceding vehicle. Specifically, when the offset is stored and neither the first target TG1a nor the other target TG1b split from the first target TG1a is not detected, the distance between the own vehicle 50 and the second target TG2 is set as the intervehicular distance without correcting the intervehicular distance based on the offset stored in the memory 230. By contrast, when it is recognized that the target split has not occurred, the process goes to a step S150 and the intervehicular distance is corrected based on the offset.

In this way, according to the fourth embodiment of the present disclosure, since the intervehicular distance is not corrected based on the offset when the first target TG1 and the second target TG2 belong to different vehicles respectively, and the target split occurs in the first target TG1, and further neither the first target TG1a (equivalent to the target TG1) nor the other target TG1b split from the first target TG1a is selected by the preceding vehicle selector 212 as the target belonging to the preceding vehicle, a likelihood that the intervehicular distance is erroneously corrected can be reduced, thereby allowing accurate intervehicular distance control.

Further, various operation systems employed in the above-described first to fourth embodiments of the present disclosure can be optionally combined and implemented. Specifically, either all of the various operation systems of the first to fourth embodiments of the present disclosure can be employed at once or any one or some of the various operation systems of the first to fourth embodiments of the present disclosure can be selectively employed as well.

Numerous additional modifications and variations of the present disclosure are possible in light of the above teachings. It is therefore to be understood that within the scope of the appended claims, the present disclosure may be executed otherwise than as specifically described herein. For example, the vehicle control system is not limited to the above-described various embodiments and may be altered as appropriate. Similarly, the vehicle control method is not limited to the above-described various embodiments and may be altered as appropriate.

What is claimed is:

1. A vehicle control system to control an intervehicular distance between an own vehicle and a preceding vehicle preceding the own vehicle based on a target belonging to the preceding vehicle detected by a reflection wave issued from a radar system, the vehicle control system comprising:
- a preceding vehicle selector to select at least one target belonging to at least one preceding vehicle, the at least one target identified based on a detection result generated by the radar system;
- a target pair recognizer to perform a pairing process, the pairing process including steps of recognizing a first target and a second target located further away from the own vehicle than the first target as a target pair belonging to one or more preceding vehicles, the target pair recognizer storing a distance between the first target and the second target as an offset when the first and the second targets meet a pairing condition, the pairing condition including at least one of a relative distance, a relative speed, and a lateral deviation amount between the first and second targets,
- the target pair recognizer repeatedly obtaining and storing determination parameters to generate a history, the determination parameters including at least one of a change in relative distance, a change in relative speed, and a change in lateral deviation amount between the first and second targets;
- an intervehicular distance setter to set a distance between the own vehicle and the first target as an intervehicular distance when the offset is stored and the target pair is detected by the radar system,
- the intervehicular distance setter setting a corrected distance calculated by subtracting the offset from a distance between the own vehicle and the second target as an intervehicular distance when the first target out of the target pair disappears from the radar system and is not detected by the radar system; and
- an intervehicular distance control executer to execute intervehicular distance control based on the intervehicular distance set by the intervehicular distance setter,
- wherein the target pair recognizer omits the pairing process even if the pairing condition is met by the first and the second targets when the history indicates that at least one of the determination parameters has either reached or exceeded a given threshold.

2. A vehicle control system to control an intervehicular distance between an own vehicle and a preceding vehicle preceding the own vehicle based on a target belonging to the preceding vehicle detected by a reflection wave issued from a radar system, the vehicle control system comprising:
- a preceding vehicle selector to select at least one target belonging to at least one preceding vehicle, the at least one target identified based on a detection result generated by the radar system;
- a target pair recognizer to perform a pairing process in a prescribed cycle, the pairing process including steps of recognizing a first target and a second target located further from the own vehicle than the first target as a target pair belonging to one or more preceding vehicles, the target pair recognizer storing a distance between the first target and the second target as an offset when the first and the second targets meet a pairing condition, the pairing condition including at least one of a prescribed relative distance, a prescribed relative speed, and a prescribed lateral deviation amount between the first and second targets,
- the target pair recognizer repeatedly obtaining and storing determination parameters in the prescribed cycle to generate a history, the determination parameters including at least one of a change in relative distance, a change in relative speed, and a change in lateral deviation amount between the first and second targets;
- an intervehicular distance setter to set a distance between the own vehicle and the first target as an intervehicular distance when the offset is stored and the target pair is detected by the radar system,
- the intervehicular distance setter setting a corrected distance calculated by subtracting the offset from a distance between the own vehicle and the second target as an intervehicular distance when the first target out of the target pair disappears from the radar system and is not detected by the radar system; and
- an intervehicular distance control executer to execute intervehicular distance control based on the intervehicular distance set by the intervehicular distance setter,
- wherein the target pair recognizer executes the pairing process only when it is recognized based on an image captured by a camera mounted on the own vehicle that the preceding vehicle is towing an object and the first and second targets meet the pairing condition.

3. A vehicle control system to control an intervehicular distance between an own vehicle and a preceding vehicle preceding the own vehicle based on a target belonging to the preceding vehicle detected by a reflection wave issued from a radar system, the vehicle control system comprising:
- a preceding vehicle selector to select at least one target belonging to at least one preceding vehicle, the at least one target identified based on a detection result generated by the radar system;
- a target pair recognizer to perform a pairing process in a prescribed cycle, the pairing process including steps of recognizing a first target and a second target located further from the own vehicle than the first target as a target pair belonging to one or more preceding vehicles, target pair recognizer storing a distance between the first target and the second target as an offset when the first and the second targets meet a pairing condition, the pairing condition including at least one of a prescribed relative distance, a prescribed relative speed, and a prescribed lateral deviation amount between the first and second targets,
- the target pair recognizer repeatedly obtaining and storing determination parameters in the prescribed cycle to generate a history, the determination parameters including at least one of a change in relative distance, a change in relative speed, and a change in lateral deviation amount between the first and second targets;
- a camera mounted on the own vehicle to capture an image of a front scenery;
- an intervehicular distance setter to set a distance between the own vehicle and the first target as an intervehicular distance when the offset is stored and the target pair is detected by the radar system,
- the intervehicular distance setter setting a corrected distance calculated by subtracting the offset from a distance between the own vehicle and the second target as an intervehicular distance when the first target out of the target pair disappears from the radar system and is not detected by the radar system; and
- an intervehicular distance control executer to execute intervehicular distance control based on the intervehicular distance set by the intervehicular distance setter,
- wherein the intervehicular distance setter sets a distance between the own vehicle and the second target as an intervehicular distance without correcting the intervehicular distance based on the offset even if the offset is stored by target pair recognizer when the first target out of the target pair disappears from the radar system and is not detected by the radar system but it is recognized based on the image captured by the camera that the second target belongs to another preceding vehicle.

4. A vehicle control system to control an intervehicular distance between an own vehicle and a preceding vehicle preceding the own vehicle based on a target belonging to the preceding vehicle detected by a reflection wave issued from a radar system, the vehicle control system comprising:
  a preceding vehicle selector to select at least one target belonging to at least one preceding vehicle, the at least one target identified based on a detection result generated by the radar system;
  a target pair recognizer to perform a pairing process in a prescribed cycle, the pairing process including steps of recognizing a first target and a second target located further from the own vehicle than the first target as a target pair belonging to one or more preceding vehicles, target pair recognize storing a distance between the first target and the second target as an offset when the first and the second targets meet a pairing condition, the pairing condition including at least one of a prescribed relative distance, a prescribed relative speed, and a prescribed lateral deviation amount between the first and second targets,
  the target pair recognizer repeatedly obtaining and storing determination parameters in the prescribed cycle to generate a history, the determination parameters including at least one of a change in relative distance, a change in relative speed, and a change in lateral deviation amount between the first and second targets;
  an intervehicular distance setter to set a distance between the own vehicle and the first target as an intervehicular distance when the offset is stored and the target pair is detected by the radar system,
  the intervehicular distance setter setting a corrected distance calculated by subtracting the offset from a distance between the own vehicle and the second target as an intervehicular distance when the first target out of the target pair disappears from the radar system and is not detected by the radar system; and
  an intervehicular distance control executer to execute intervehicular distance control based on the intervehicular distance set by the intervehicular distance setter,
  wherein the intervehicular distance setter sets a distance between the own vehicle and the second target as the intervehicular distance without correcting the intervehicular distance based on the offset even if the offset is stored, when the first target splits into first and second pieces and neither the first piece nor the second piece is selected by the preceding vehicle selector as the target belonging to the preceding vehicle.

5. A vehicle control method of controlling an intervehicular distance between an own vehicle and a preceding vehicle preceding the own vehicle based on a target belonging to the preceding vehicle detected by a reflection wave issued from a radar system, the vehicle control method comprising the steps of:
  selecting at least one target belonging to at least one preceding vehicle by identifying the at least one target based a detection result generated by the radar system;
  performing a pairing process in a prescribed cycle, the pairing process including steps of recognizing a first target and a second target located further from the own vehicle than the first target as a target pair belonging to one or more preceding vehicles and storing a distance between the first target and the second target as an offset when the first and the second targets meet a pairing condition, the pairing condition including at least one of a prescribed relative distance, a prescribed relative speed, and a prescribed lateral deviation amount between the first and second targets;
  repeatedly obtaining and storing determination parameters in the prescribed cycle to generate a history, the determination parameters including at least one of a change in relative distance, a change in relative speed, and a change in lateral deviation amount between the first and second targets;
  setting either a distance between the own vehicle and the first target as an intervehicular distance when the offset is stored and the target pair is detected by the radar system or a corrected distance calculated by subtracting the offset from a distance between the own vehicle and the second target as an intervehicular distance when the first target out of the target pair disappears from the radar system and is not detected by the radar system;
  executing intervehicular distance control based on the intervehicular distance set; and
  omitting the pairing process even if the pairing condition is met by the first and the second targets when the history indicates that at least one of the determination parameters has either reached or exceeded a given threshold.

* * * * *